Mar. 6, 1923.

R. L. BESELIN

ADVERTISING DEVICE

Filed Mar. 28, 1922

1,447,749

Inventor

R. L. Beselin.

By Arthur H. Sturges.
Attorney

Patented Mar. 6, 1923.

1,447,749

UNITED STATES PATENT OFFICE.

RAYMOND L. BESELIN, OF OMAHA, NEBRASKA.

ADVERTISING DEVICE.

Application filed March 28, 1922. Serial No. 547,402.

*To all whom it may concern:*

Be it known that I, RAYMOND L. BESELIN, a citizen of the United States, residing at Omaha, in the county of Douglas and State of Nebraska, have invented certain new and useful Improvements in Advertising Devices, of which the following is a specification.

The present invention relates to advertising devices and more particularly to a device which may be carried upon an automobile for attracting attention to certain classes of goods.

An object of the invention is to provide an advertising device which simulates an article of merchandise and from which smoke or fumes are emitted in the use of the article, and which may be simulated by coupling the enlarged device to the exhaust of an automobile in such manner that the exhaust may be discharged from the article in a manner suggestive of the ordinary smoking or burning of the natural article.

Another object of the invention is to provide a device of this character which may be used in conjunction with delivery bodies for automobiles so as not to interfere with the ordinary use of the vehicle and at the same time to accomplish the purposes of this invention.

Another object of the invention is to provide an advertising device which may be quickly and easily applied to an ordinary automobile without changing the construction of any of the parts thereof and which may be coupled to the ordinary exhaust pipe of the automobile without changing its position or construction.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a side elevation, partly in section, of an automobile of the delivery type having an advertising device constructed according to the present invention applied thereto;

Figure 1:
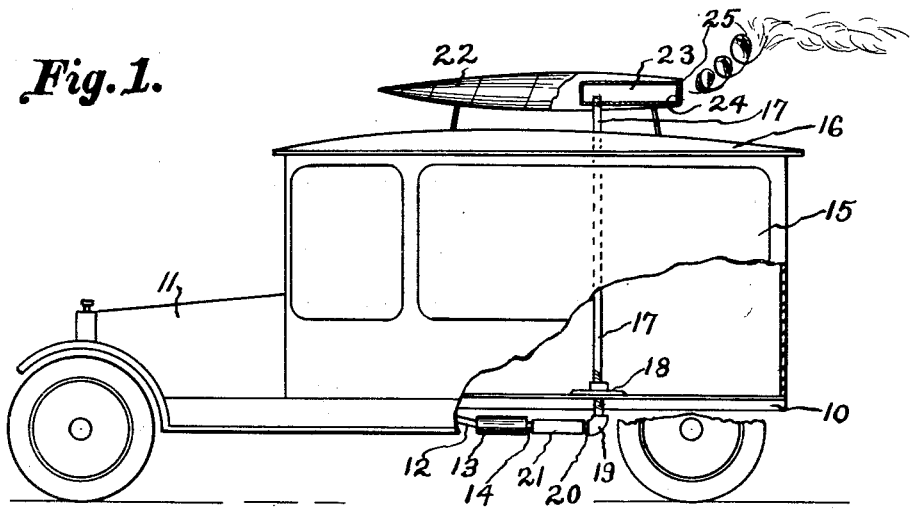
Figure 2:
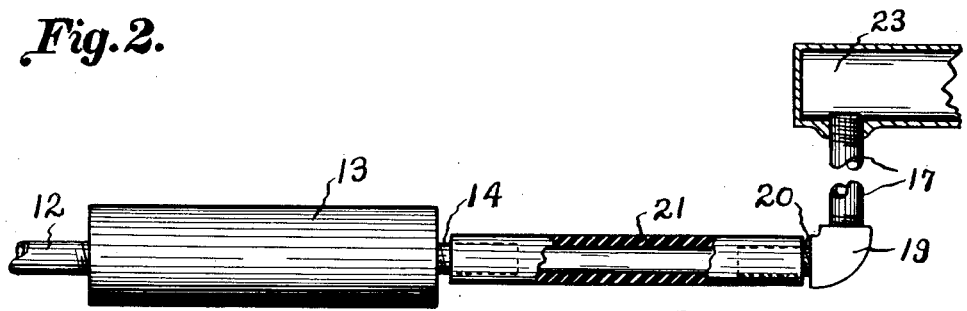
Fig. 2 is a fragmentary enlarged view partly in section of the main portions of the advertising device, showing the coupling of the same to the exhaust pipe of the automobile.

Referring to the drawing, 10 designates a motor vehicle frame of conventional form having a hood 11 for housing the engine and provided with an exhaust pipe 12 which leads from the engine and which is disposed beneath the frame 10. The pipe 12 leads to a muffler 13 and the latter is provided with the usual outlet pipe 14 forming an extension of the exhaust pipe 12. These parts are of conventional construction and found in all motor vehicles of present day type. The frame 10 may be provided with a suitable delivery body 15 having a roof or top 16 which is utilized in the present instance in supporting the advertising device.

The body 15 supports, in any suitable manner, a pipe 17 which rises through the body and through the roof 16 and which may be supported at its lower end upon a base plate 18 threaded or otherwise suitably secured to the pipe 17 and which rests upon the floor of the body 15. The pipe 17 is adapted to convey the exhaust gases from the muffler 13 to a point above the body 15, and for this purpose the pipe 17 projects below the body 15 and the frame 10 and is provided with an elbow coupling 19 which carries a spud 20 projecting toward and arranged in spaced relation to the outlet pipe 14 of the muffler 13. To compensate for inequalities in movement and vibration of the body 15 and muffler 13, a preferably flexible coupling 21 is employed and made of a suitable length of flexible hose secured by friction or other suitable means at opposite ends over the outlet pipe 14 and the spud 20.

Figure 3:
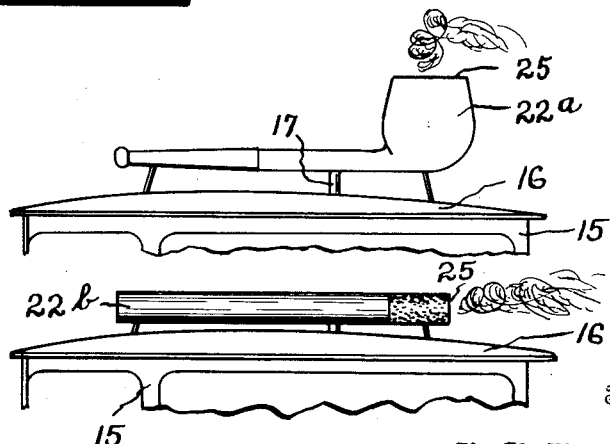
Fig. 3 is a slight modification of the general outline of the advertising device; and, Fig. 4 is another modification showing another different exterior configuration to the advertising device.
Figure 4:
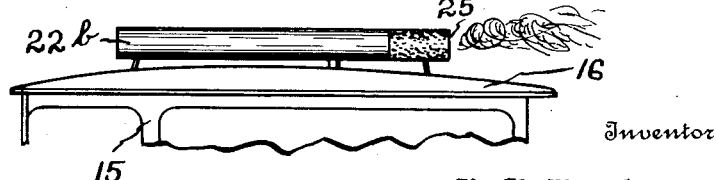

The pipe 17 extends at its upper end beyond the top 16 and serves as a support for an advertising body portion 22 which is shaped to the configuration of the article to be advertised, such as in the form of a cigar, as shown in Fig. 1; in the form of a pipe 22ª, as shown in Fig. 3; or in the form of a cigarette 22ᵇ, as shown in Fig. 4. These advertising bodies may be enlarged to any suitable degree dependent upon the size of the vehicle and the manner of display and may be constructed of any suitable non-inflammable material or the like as is found expedient in the manufacture and use of the device.

The advertising body 22 may be provided with a cavity or drum 23 of metal or the like which communicates with the upper end of the pipe 17 for receiving the exhaust gases, smoke and the like, and the drum 23 is provided with an open end or portion 24 which is directed toward and in registry with that portion of the article which corresponds to the smoking portion of the natural article to be advertised. In Fig. 1, the opening 24 of the drum is located at the rear end of the enlarged body 22 so that the smoke and gases from the exhaust of the automobile may be emitted from the rear end of the advertising body. In order to impart a finished apearance to the rear end of the advertising body 22, and also for the purpose of suitably diffusing the smoke and gases, the advertising body carries a perforated disk or screen 25 which covers the rear end of the drum 23.

In operation, as the vehicle is operated, the exhaust smoke and gases discharged from the muffler 13 through the outlet pipe 14 are transmitted through the flexible connection 21 to the pipe 17, and thence to the interior of the advertising body 22. From the advertising body 22, the smoke and gases are discharged in suitable clouds through the screen 25 to simulate the natural smoking of the original article and such smoking in conjunction with the appearance of the body 22 is adapted to attract attention and thus serve as an efficient and distinctive advertising device for the represented articles.

The flexible coupling 21 is adapted to absorb vibration incident to relative movements between the muffler 13 and the spud 20 and to permit of the relative movements of these parts incident to the operation of the vehicle. The coupling member 21 also serves as a ready means for connecting and disconnecting the advertising device at will.

It is of course understood that the display body 22 may be of any suitable configuration other than that shown in the accompanying drawing, and that the drum 23 may be correspondingly shaped and its outlet 24 may be arranged in any suitable position to discharge and diffuse the smoke and gases as made necessary to appropriately simulate the natural article when smoking, or burning.

I do not wish to be restricted to the size, form, and proportions of the various parts, and obviously changes could be made in the construction herein described without departing from the spirit of the invention, it being only necessary that such changes fall within the scope of the appended claims.

What is claimed is:

1. An advertising device for motor vehicles comprising an advertising body shaped to the configuration of an article to be smoked and adapted to be mounted upon an automobile, a conduit leading from the advertising body and secured to the vehicle, means carried by the advertising body for diffusing smoke and gases from the pipe, and a flexible coupling between said pipe and the exhaust portion of the automobile for permitting relative movements between the exhaust portion and the pipe during travel of the vehicle and for transmitting the exhaust smoke and gases to the advertising body.

2. An advertising device for automobiles comprising a conduit mounted upon an automobile, an enlarged advertising body connected to one end of the pipe and having an outlet, and a flexible connection for the pipe adapted to engage the exhaust portion of the automobile to convey exhaust smoke and gases to the pipe and to said advertising body.

3. An advertising device for automobiles comprising an upwardly extending pipe adapted to be mounted in the body of an automobile, an advertising body connected to the upper end of the pipe and having an outlet, a drum mounted in the advertising body connected to the pipe and having an open end registering with the opening in the advertising body, and a flexible connection for the lower end of the pipe adapted to engage the exhaust portion of the automobile for conducting exhaust smoke and gases through such pipe to the drum.

4. An advertising device for automobiles comprising a conduit adapted to be carried by an automobile, an advertising body connected to the pipe for receiving the exhaust gases and smoke therefrom, and a diffusing disk member mounted in the wall of the advertising body for exhausting the smoke and gases therefrom in simulation to the natural burning of the article advertised.

In testimony whereof, I have affixed my signature in presence of two witnesses.

RAYMOND L. BESELIN.

Witnesses:
HIRAM A. STURGES,
ARTHUR H. STURGES.